Figure 1:
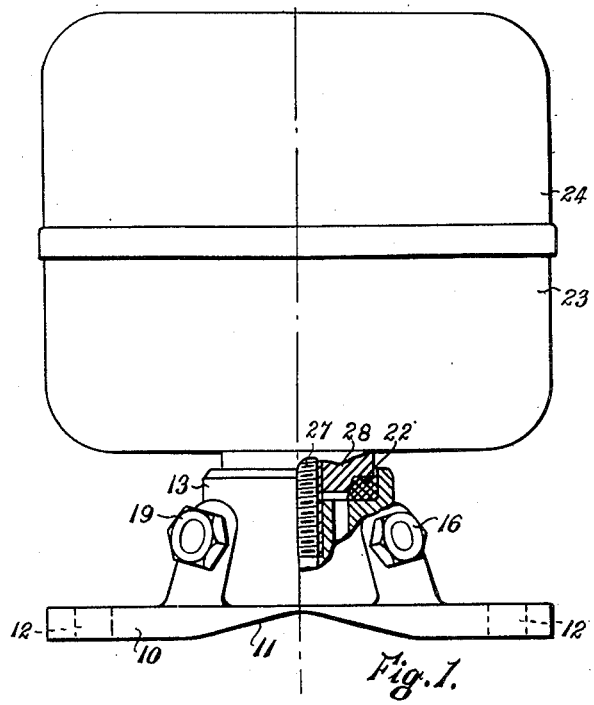

Dec. 23, 1952   R. A. BALLEY   2,622,737
FILTER

Filed Jan. 27, 1949   2 SHEETS—SHEET 1

INVENTOR
RONALD ALBERT BALLEY
Richardson and David
ATTYS

Dec. 23, 1952 R. A. BALLEY 2,622,737
FILTER
Filed Jan. 27, 1949 2 SHEETS—SHEET 2

INVENTOR
RONALD ALBERT BALLEY
By Richardson and David
ATTYS

Patented Dec. 23, 1952

2,622,737

UNITED STATES PATENT OFFICE 2,622,737

FILTER

Ronald Albert Balley, Bletchley, England, assignor to Wipac Filtration Limited, Bletchley, England, a company of Great Britain Application January 27, 1949, Serial No. 73,050
In Great Britain January 29, 1948

3 Claims. (Cl. 210—148)

This invention relates to filters for liquid and of the kind in which liquid required to be filtered is caused to flow through filtering media permanently enclosed within a canister which is discarded when the filtering media are exhausted.

An object of this invention is to provide a filter of this kind and in which an exhausted canister can be easily replaced by a new one.

Another object is to provide a cheap and simple canister for my improved filter.

Another object is to improve the performance of by-pass oil filters.

Another object is to enable various filtering capacities to be provided with a small number of standardised parts.

According to this invention, a filter of the kind specified comprises a support part and a canister part, a screw-threaded spigot on one of said parts engaged in a socket in the other of said parts, an annular chamber surrounding said spigot between two facings on said two parts respectively, annular sealing means clamped between said facings and closing the periphery of said chamber, a flow (or return) duct in said one part leading longitudinally through said spigot and communicating directly with a duct in said other part and opening into said socket, and return (or flow) ducts in each of said parts opening directly into said annular chamber. The socket may be provided with an internal screw thread adapted to co-operate with the screw thread on the spigot. A continuous flow and return circuit is obtained through the filter, irrespective of the angular relationship of the two parts about the spigot axis.

The annular facing on the one of said parts provided with the socket may have a flange extending axially and surrounding and locating a sealing ring of resilient material, the annular facing on the one of said parts provided with the spigot being provided with a step the riser of which fits within the sealing ring. The face of said riser or the inner face of said flange or both of said faces may be battered in such a manner as to compress the sealing ring radially as the parts are forced together.

In a preferred arrangement the support part is provided with a screw-threaded socket.

According to this invention in another aspect, a canister for use in our improved filter includes a closed shell containing filtering media, an externally screw-threaded hollow spigot communicating with the interior of the canister on one side of the filtering media, a radially extending annular end facing coaxially surrounding the spigot, an axially extending annular facing adjoining the periphery of the end facing, and a port leading from the interior of the canister at the other side of the filtering media and opening at the end facing. These facings may be constituted by a stepped annular facing coaxially surrounding the spigot and having a plane or substantially plane circular border and a raised central portion, the said port opening at the raised central portion of the stepped facing.

In a preferred form of such canister the shell is substantially cylindrical, the spigot is a tubular screw having a head within the shell, the said facings are formed on a nut engaged on the spigot and bearing against the exterior surface of one end of the shell, and a tubular extension of the spigot screw opens near the other end of the shell.

In an alternative form of filter having the features hereinbefore specified as being in accordance with this invention the said socket penetrates the one of said parts in which it is provided, the socket accommodating a tubular capped nut provided with a radial duct and an annular facing reacting through sealing means on a facing on the last-mentioned part on the side of the radial duct farther from the spigot, so that the two parts can be connected together by relative rotation of the nut and the part having the spigot. In this case also a continuous flow and return circuit is obtained through the filter, irrespective of the angular relationship of the two parts about the spigot axis.

Figure 2:
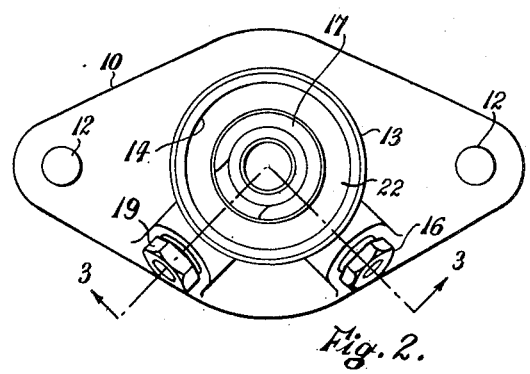
Figure 3:
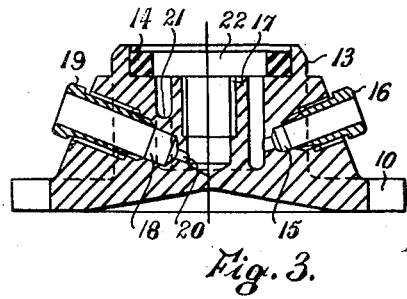
Figure 4:
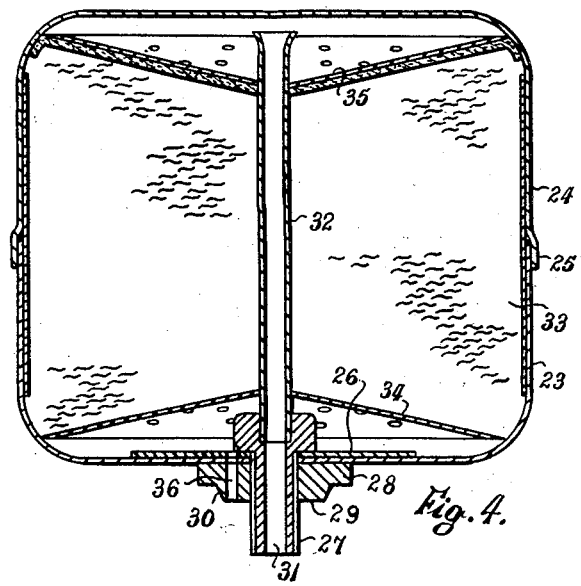
Figure 5:
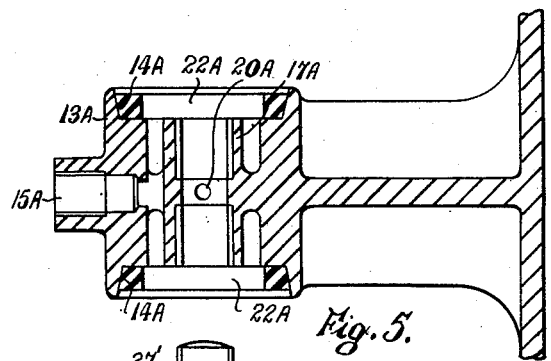
Figure 6:
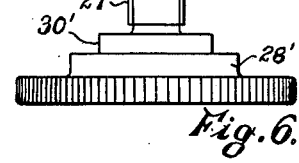

Examples of the invention as applied to a by-pass filter for the lubrication systems of automobile engines will be described with reference to the accompanying drawings, in which:

Fig. 1 is a side elevation of one form of filter in accordance with the invention, a portion of a support part being shown in section, Fig. 2 is a plan of the support part shown in Fig. 1, Fig. 3 is a section on the line 3—3 in Fig. 2, Fig. 4 is a section of the canister appearing in Fig. 1, Fig. 5 is a sectional side elevation of another form of the support part, and Fig. 6 is a side elevation of a dummy plug for use with the support part shown in Fig. 5.

In the example shown in Figs. 1 to 4, the support, which may be a die casting, comprises an elongated base plate 10 having a shallow and broad V-section groove 11 running transversely across the middle of its under side and a screw hole 12 near each end, so that it can be fixed to a plane surface by screws or mounted on a cylindrical member by means of a hair-pin bolt. A tubular boss 13 projecting from the base plate 10 has a bore of 1⅜ in. Its outer end is counterbored at 14 to a diameter of 1¼ in. and to a depth of ¼ in. so as to provide a plane circular facing surrounded by an axially extending flange. The bore communicates with a hole 15 screwed for the reception of an oil inlet union 16. A hollow boss 17 having a diameter of ⅝ in. is disposed coaxially in the bore and screwed internally with a ¼ in. gas thread to form the socket. A hole 18 screwed for the reception of an oil outlet union 19 passes through a radial web 21 connecting the two bosses and communicates with the interior of the socket by a restricted bore 20.

A resilient washer 22, which is 1/4 in. square in section and 1 1/4 in. in external diameter, is fitted within the counterbore 14. This washer may be made of asbestos fibre and cork bonded with oil-resistant synthetic rubber, or of any other resilient material resistant to oil and taking very little permanent set on compression.

The canister shell (Fig. 4) consists of two cup-shaped pressings 23 and 24 joined together lip to lip by a sweated spigot-and-socket joint 25 to form a substantially cylindrical vessel with slightly domed ends. One end of the shell is reinforced by a washer 26 spot-welded to the inside of the pressing 23. The spigot is formed by a headed screw 27 threaded 1/4 in. gas thread and passing through the washer and a central hole in the adjacent end wall of the shell. The head of the screw is held against the washer by a nut 28 of circular section screwed onto the projecting part of the screw. The junction faces of these parts are sealed by sweating. The outer end face of the nut has a plane annular facing 29, which is 1 3/8 in. in diameter and which surrounds the projecting portion of the screw. The border of the nut is turned to form a step 3/16 in. deep, the diameter of the nut beyond the step being 1 1/16 in. The riser 30 of the step is battered to frusto-conical form having a slant angle of 10° or 15°.

The screw spigot 27 has an axial bore 31, and a small diameter oil outlet tube 32 spigoted and sweated into this bore extends axially through the canister, terminating near its far end. Filter media 33 of any desired form are packed between conical perforated diaphragms 34 and 35 in the space between this tube and the cylindrical wall of the shell. An oil inlet port 36 is drilled through the reinforcing washer 26, the cup 23 and the nut 28, opening at the plane annular facing 29.

When the canister is screwed home on the support, the resilient washer 22 is compressed, as shown in Fig. 1, between the plane annular facings on the canister and the support and at the same time confined radially by the axially extending flange on the support and the battered riser 30 of the step on the canister, so that an oil-tight seal is formed. At the same time the port 36 communicates with the inlet hole 15 irrespective of the angular relationship of the canister and the support. It is not essential for the canister to be screwed home hard, since the tapering section of the annular space in which the resilient washer is confined has the effect that, if oil leaks between the washer and the plane facing on the support, the resulting deformation of the washer intensifies its sealing effect at the narrower end of the annular space.

A practical advantage of this filter is that, if the support is mounted socket uppermost, and with the oil pipes rising to it, the canister can be removed without spilling oil.

This example, when applied to a by-pass filter in the lubrication system of an internal-combustion engine, has the further advantage of providing a restricted leakage path in shunt with the filter element through the helical clearance space between the co-operating screw threads. By-pass filters are often required to be connected by long pipes to parts of the system where a full flow of oil occurs, and in consequence, in starting the engine from cold, by-pass filtration is sluggish for the considerable time required for the cold and viscous oil to be displaced from the by-pass circuit. The existence of the above-mentioned shunt leak accelerates such displacement without appreciably affecting the operation of any part of the lubrication system when the temperatures in it have attained their normal working values.

The support may be modified by making it of manifold form with connections for any desired number of filter canisters operating in parallel. Surplus connections can be stopped off by dummy plugs. One such arrangement is shown in Figure 5, in which the tubular boss 13A and the socket boss 17A are double-ended and communicate respectively with a common inlet 15A and a common outlet 20A. In this example the counterbores 14A are frusto-conical so as to cause radial compression of the resilient washers 22A as they are compressed axially. Fig. 6 shows a dummy plug for use in stopping-off one of the sockets of the support when only one canister is in use. The plug consists of a screw-threaded spigot 27' integral with a head 28' having a stepped annular facing. The riser 30' of this step may be cylindrical as shown, or frusto-conical like the riser 30 in Fig. 4.

I claim:

1. A detachable filter canister and support combination comprising a threaded spigot on one of said parts and a threaded socket in the other of said parts, said spigot being engageable with said socket, said spigot and socket constituting a flow channel between said parts, said spigot having a nut thereon for retaining the spigot on its respective part, said nut having an annular shoulder thereon coaxial with said spigot, said socket part having a corresponding coaxial recess therein, said shoulder and recess facing each other and forming a chamber therebetween, a port in said canister adjacent said spigot, said facing parts having ports therein aligned with said canister port, and constituting, with said chamber, another flow channel of said parts, a sealing ring disposed between said shoulder and recess and seated in said recess, said ring being compressed between said facing parts to form a seal for said flow channels when the canister and support are forced together.

2. A filter combination as claimed in claim 1, wherein one face of said shoulder is angularly disposed with respect to the longitudinal axis of the spigot so as to compress said sealing ring radially as the parts are forced together.

3. A filter combination as claimed in claim 1, wherein one face of said recess is angularly disposed with respect to the socket so as to compress said sealing ring radially as the parts are forced together.

RONALD ALBERT BALLEY.

REFERENCES CITED

The following references are of record in the file of this patent:

UNITED STATES PATENTS

| Number | Name | Date |
| --- | --- | --- |
| 1,690,564 | Ward | Nov. 6, 1928 |
| 1,791,046 | Sweetland | Feb. 3, 1931 |
| 1,982,376 | De Lancey | Nov. 27, 1934 |
| 2,165,826 | Werder | July 11, 1939 |
| 2,196,821 | Arnold | Apr. 9, 1940 |
| 2,203,668 | Burckhalter | June 11, 1940 |
| 2,287,982 | Frudden | June 20, 1942 |
| 2,347,184 | Dick, et al. | Apr. 25, 1944 |
| 2,462,943 | Campbell | Mar. 1, 1949 |